United States Patent
Junkersfeld et al.

(10) Patent No.: US 7,248,781 B2
(45) Date of Patent: Jul. 24, 2007

(54) LIVE PICTURE PRESENTATION WHILE DIGITAL VIDEO RECORDING

(75) Inventors: Phillip Aaron Junkersfeld, Fishers, IN (US); Daniel Richard Schneidewend, Fishers, IN (US); Thomas Edward Horlander, Indianapolis, IN (US); Gary Robert Gutknecht, Noblesville, IN (US); Robert Vincent Krakora, Carmel, IN (US); Scott Allan Kendall, Westfield, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1062 days.

(21) Appl. No.: 10/192,769

(22) Filed: Jul. 10, 2002

(65) Prior Publication Data

US 2003/0202775 A1 Oct. 30, 2003

(51) Int. Cl.
H04N 5/76 (2006.01)
H04N 5/00 (2006.01)

(52) U.S. Cl. ........................................ 386/68; 386/125

(58) Field of Classification Search .............. 386/6–8, 386/46, 68–70, 111, 125
See application file for complete search history.

(56) References Cited

U.S. PATENT DOCUMENTS 5,715,354 A 2/1998 Iwamura et al.
5,999,691 A * 12/1999 Takagi et al. .................. 386/46
6,069,993 A 5/2000 Kawara
6,078,723 A 6/2000 Yanagihara et al.
6,642,939 B1 * 11/2003 Vallone et al. ............... 715/721

* cited by examiner

Primary Examiner—Thai Q. Tran
Assistant Examiner—Nigar Chowdhury
(74) Attorney, Agent, or Firm—Joseph J. Laks; Robert B. Levy; Jorge Tony Villabon

(57) ABSTRACT

A method and a system for performing trick mode features in a personal video recorder without introducing a channel change delay during normal viewing. The method includes the steps of recording a video source signal and concurrently bypassing the video source signal to a display device, without experiencing any buffering delay associated with the recording step. During trick mode operation the bypassing step can be automatically terminated and a recorded version of the video source signal can be substituted and sent to the display. The bypassing step further can include substituting, without any buffering delay, an alternate video source signal in response to a user selection of an alternate video source signal channel. A user notification can be generated to acknowledge receipt of a trick mode command. The user notification can be terminated once the step of substituting the recorded version of the video source signal has been completed.

16 Claims, 2 Drawing Sheets

LIVE PICTURE PRESENTATION WHILE DIGITAL VIDEO RECORDING

BACKGROUND OF THE INVENTION

1. Technical Field

The present invention relates to the field of digital video recording, and more particularly to personal video recorder trick modes.

2. Description of the Related Art

Personal video recorders (PVRs) allow users to view a broadcast multimedia presentation on a delayed schedule, and even permit delayed viewing while the broadcast continues. After recording the broadcast multimedia presentation onto a storage medium is commenced, a user can begin playback of the recorded portion of the multimedia presentation. If a user chooses, he can pause the multimedia presentation while the remainder of the multimedia presentation continues to be recorded. Later the user can recommence playback of the multimedia presentation from where it was paused, or from anywhere else within the recorded portion of the presentation. Further, the user also can perform other trick modes on the recorded material, such as fast forward, rewind, slow motion, fast motion, etc.

Although currently available personal video recorders provide added convenience to users by enabling them to perform trick modes on broadcast presentations, the live presentation of the PVR is delayed. Personal video recorders buffer the video signal derived from a broadcast source via an MPEG encoder, a data storage device, and then through an MPEG decoder before a video signal is provided to a display device. The buffering step results in an appreciable time delay between the actual, real time broadcast occurrence and the resulting display presentation. This time delay is especially inconvenient during a channel change. When a channel is changed the user does not receive display verification of change until the source signal from the new channel has been processed through the buffering step. In some instances this process can take multiple seconds. Further, the time delay during channel changes can be non-uniform. For example, in a cable television system that provides both analog channels and digital channels, typically a PVR can have a non-uniform buffer delay because analog video source signals require encoding, for example using MPEG compression, prior to storage, whereas no such delay results with broadcast digital video signals which are MPEG compressed prior to transmission. Hence, changing channels in a system incorporating a PVR can be an inconvenient and frustrating experience. Furthermore rapid channel hopping or surfing is largely precluded by the delay in new channel content display.

SUMMARY OF THE INVENTION

The present invention provides a method and a system for performing trick mode features in a personal video recorder whilst avoiding the introduction of a channel change delay during normal viewing. The method includes the steps of recording a video source signal and concurrently bypassing the video source signal to a display device, without experiencing any buffering delay associated with the recording step. Responsive to a user trick mode request, the bypassing step can be automatically terminated and a recorded version of the video source signal can be substituted and sent to the display. Further, a trick mode can be executed using the recorded video source signal.

The bypassing step further can include substituting, without any buffering delay, an alternate video source signal to the display device in response to a user selection of an alternate video source signal channel. Additionally, a step of generating a user notification can be implemented to acknowledge receipt of a trick mode command when a user trick mode request is received. The user notification can be terminated once the step of substituting the recorded version of the video source signal to the display has been completed.

The recording step further can include recording, without interruption, an alternate video source signal in response to a user selection of an alternate video source signal channel. Additionally, the alternate video source signal can be recorded without deleting any previously recorded video source signal. Trick mode operation can be transitioned to playback from the video source signal by advancing the previously recorded version of the video source signal up to the most recently recorded portion of the video source signal and substituting the video source signal to the display device in place of the recorded version.

DETAILED DESCRIPTION

Figure 1:
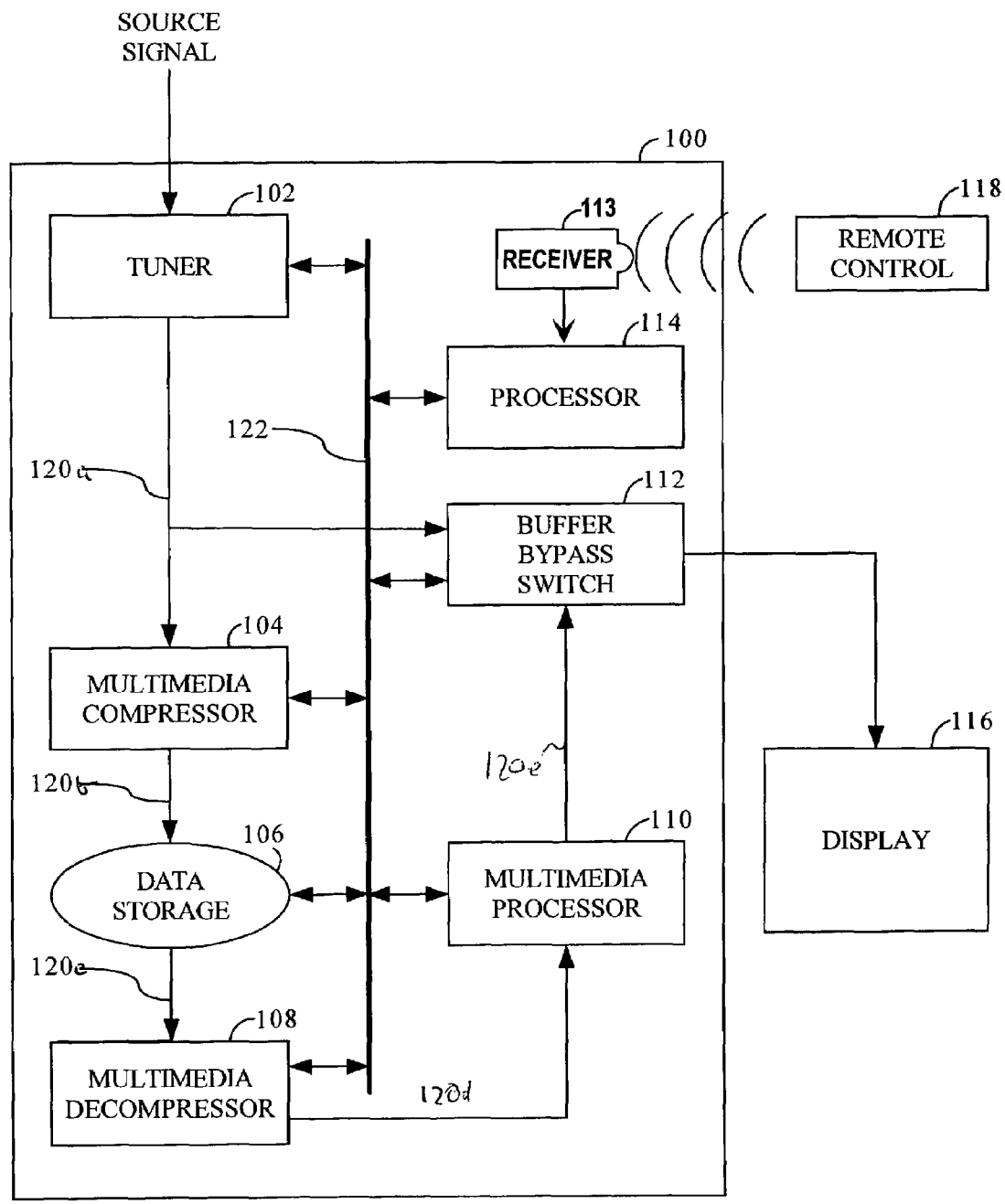
FIG. 1 is a block diagram of a personal video recorder incorporating a selective storage bypass for live presentation of broadcast multimedia programming during channel changes in accordance with the present invention.

FIG. 1 shows block diagram of a personal video recorder (PVR) 100 incorporating a selective storage bypass for "live" or nominally concurrent presentation of broadcast multimedia programming during channel changes. The selective storage bypass enables the performance of trick mode features in the PVR 100 without the introduction of channel change delay during normal viewing. As used herein, trick mode processing includes stop, pause, fast forward, rewind, slow mode playback, fast mode playback, and buffered playback.

The personal video recorder 100 includes a tuner 102 that can selectively tune to specific broadcast channels and can receive one or more broadcast source signals containing multimedia content. For example, tuner 102 can select channels received from a cable television service, a satellite television service, conventional terrestrial broadcast and any other type multimedia broadcast. The term multimedia as used herein can include audio data, video image data, graphical data or any combination thereof. Broadcast multimedia is multimedia that is propagated from a source location to one or more receiver locations, for example a television program, including at least one of video images, audio signals, and textual and or graphical image representative data.

Tuner 102 can incorporate electronic circuitry to convert broadcast source signals into digital multimedia data streams (video, audio etc. source signals) representative of the multimedia content contained in the broadcast source signal. For example, tuner 102 can receive a frequency modulated broadcast source signal, de-modulate, down convert and perform analog to digital conversion on the broadcast source signal. In another arrangement the tuner 102 can receive broadcast source signals already in a digital format and selectively choose between source signals. As used herein, the term video source signal refers to a source signal containing audio data, video data, or any combination thereof.

The personal video recorder 100 also can include a multimedia compressor. Although the multimedia compressor 104 is not absolutely necessary for the operation of the invention, incorporation of the multimedia compressor 104 can be advantageous. The multimedia compressor 104 can perform multimedia compression on the video source signal 120*a* to reduce the amount storage space required to store a compressed form of the video source signal 120*b*. One such multimedia compression format is MPEG-2. Other multimedia compression formats are MPEG-1 and MPEG-4. Nevertheless, multimedia compression formats change from time to time and the invention is not limited in this regard.

Data storage 106 also can be included in the PVR 100 to buffer or store video source signals. Data storage 106 can be any data storage device that stores data. For example, data storage 106 can be an electronic storage medium, a magnetic storage medium, an optical storage medium, or a magneto-optical storage medium. In one embodiment the data storage 106 can be a hard disk drive. However, the invention is not limited in this regard as other storage devices can be used. In operation, the data storage 106 can be disposed to receive video source signals from the multimedia compressor 104. In another arrangement the data storage can receive uncompressed data from tuner 102.

Personal video recorder 100 also can incorporate a multimedia decompressor 108 which provides a process essentially complementary to that of compressor 104 and forms from data storage output signal 120*c* an uncompressed video signal 120*d* capable of display. The multimedia decompressor 108 can receive compressed video source signals from the data storage 106. Notably, the multimedia decompressor 108 can be embodied in a same electronic unit as the multimedia compressor 104, for example in a coder-decoder (CODEC). However, the multimedia compressor 104 also can be separate from the PVR. For example, in one arrangement the multimedia decompressor can be incorporated into a device, for example an integrated receiver decoder (IRD) which can receive a compressed video source signal from PVR 100 and provide uncompressed output signal for display.

A multimedia processor 110 can receive video source signals from the multimedia decompressor 108 and perform trick mode processing on the video source signals. Further, the multimedia processor 110 can perform other video processing. For example, the multimedia processor can format the video source signals for presentation on display 116. In one arrangement the multimedia processor 110, the multimedia decompressor 108, and the multimedia compressor 104 can be implemented as a single processing device.

The personal video recorder 100 can also include a buffer bypass switch 112. The buffer bypass switch can be implemented as an radio frequency RF switching device, as an intermediate frequency IF switching arrangement, a baseband signal switch, or any other device that can select between two video source representative signals. The buffer bypass switch 112 can be disposed, as depicted in FIG. 1, to provide live or real time presentation of input video source signals by establishing a connection to signal path 120*a* prior to the data storage 106. Further, the buffer bypass switch 112 can provide an alternate connection to the multimedia signal path 120*d* after the data storage 106 to permit viewing of recorded video source signals. The arrangement shown in FIG. 1 assumes that the video source signals are uncompressed and a single multimedia processor controls video source signal compression, decompression and processing, with the buffer bypass switch 112 providing connection to the uncompressed multimedia signal path 120 before and after the multimedia processor. However, the arrangement shown in FIG. 1 is reconfigurable based the type of video source signal selected as an input, for example, compressed or uncompressed. If a compressed signal is input multimedia compressor 104 is not required and the signals may be written to storage 106 without significant processing.

Processor 114 can communicate with other PVR 100 components via a system bus 122. For example, when a channel change command is received from a user via remote control unit 118 and receiver 113, the processor 114 can notify the buffer bypass switch 112 to couple live video source signals from the tuner to display 116, bypassing compression/decompression and data storage 106. The processor 114 also can control the buffer bypass switch to couple for display stored video source signals previously recorded and processed, for example when a trick mode command has been received.

A remote control unit 118 can be used with the PVR 100 as a user interface. The remote controller 118 can be used to enter user commands via receiver 113 which supplies control data to processor 114 for control instruction decoding. For example, remote controller 118 can be used for channel selection, video and audio trick mode operation, on/off functions, entering data, and other user selectable commands and data entries. Display 116 can be connected to an output port of the PVR 100 to allow viewing of both multimedia presentations and control menus by on screen display. Display 116 can be a video monitor display, a television receiver, a computer display, or any other multimedia performance device.

Figure 2:
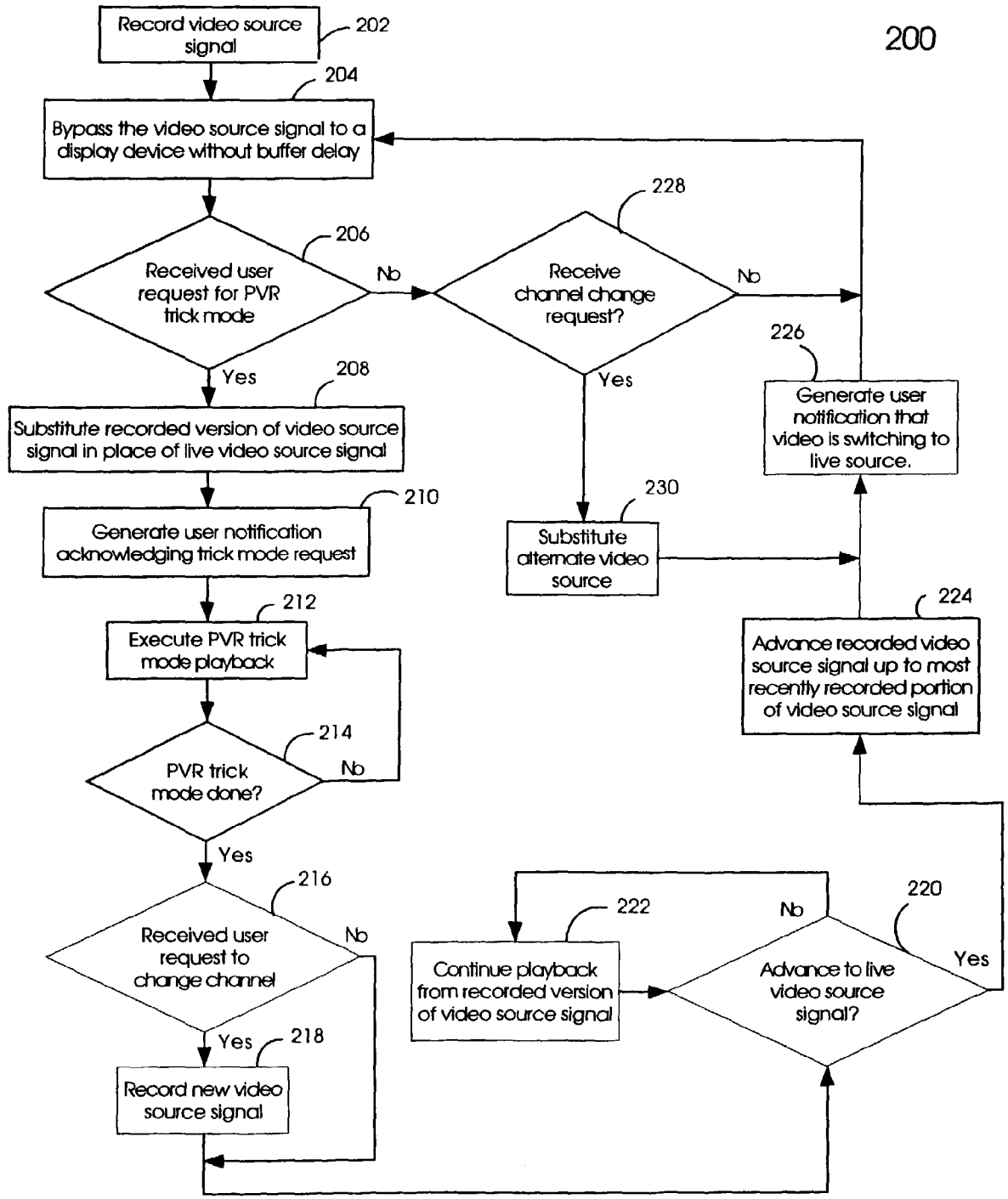
FIG. 2 is a flow chart showing the method of selectively bypassing storage in a personal video recorder during channel changes in accordance with the present invention.

FIG. 2 is a flow chart 200 that shows a method of selectively bypassing storage in a personal video recorder during channel changes. Referring to step 202, recording of a multimedia source signal can commence and continue throughout the process. A default condition sets the buffer bypass switch 112 to provide real time monitoring by feeding the video source signal to the display 116 directly from tuner 102. This allows viewing of a live multimedia broadcast on display 116 without buffer delay, as shown in step 204. Alternatively, the bypass switch can feed display 116 with the stored video source signal from the data storage 106, after buffering. The video source signal recovered from the data storage 106 can have a delay associated with the buffering process as a consequence of compressor 104, data store 106, and decompressor 108.

Referring to decision block 206 and step 208, a user can request PVR trick mode functions via remote control unit 118. The PVR trick mode request can be received from the remote control 118 by the receiver 113. The request then can be forwarded to processor 114 to implement the request. The processor can notify the buffer bypass switch 112 to select video source signals 120*e* supplied by multimedia processor 110, substituting a recorded version of the video source signal in place of the live real time video source signal 120*a*. A user notification then can be generated acknowledging the trick mode request, as shown in step 210. For example, the multimedia processor can generate an on screen notification for insertion into signal 120*e* which is coupled for display. Trick mode playback by PVR 100 is then executed until complete, as shown in step 212 and decision block 214. For example, completion can result from the user selectably terminating the trick mode by choosing to return to normal play speed viewing, or by selecting real time viewing of the source signals.

In the case that a user is viewing a live multimedia broadcast and selects the pause trick mode, notification is provided that pause mode has been selected and is operative. This feature is beneficial because there is a time delay inherent in the recording and playback process. Hence, when a user viewing the source signal in real time selects the pause mode, the recorded version of the broadcast is not at the program time required to display the frame of viewer interest when the pause mode was selected. The on screen notification can therefore remain on the display until the user selected frame where the live multimedia broadcast was paused has been stored by data storage 106 and is ready for recovery and display. The on screen notification can alert the user that the pause command has been recognized and is being processed by the PVR. Once the video source signal recorded and read out from data storage 106 reaches the frame where the live multimedia broadcast was paused, the notification can be removed from the display and, for example, substituted with a message indicating that "slo-mo" or "trick play" is ready. Thus the image frame where the presentation was paused can be displayed and scrutinized using the recorded video source signal.

Referring to decision block 216 and step 218, a user can change channels while viewing recorded video images accessed from data storage 106. When the tuner 102 receives a channel change request from remote control 118 via processor 114, the tuner can change the channel of the source signal to a new source in accordance with the channel change request. In one arrangement the user can be provided an option to record the new source in a data storage location different from location of the video presentation presently being viewed. In this way the user can finish viewing the current presentation before viewing the newly recorded presentation. However, the user also can be provided an option to begin viewing the new presentation immediately while still retaining the previous program record.

In a further arrangement, prior to substituting and displaying the live video signal, the processor 114 can advance or speedup playback of the recorded video signal such that the most recently recorded portion of video source signal is read from storage 106, as shown in step 224. Thus by use of an increased playback speed buffer latency can be minimized.

Referring to step 226, a user notification can be provided to inform the user that the video source is being changed from the recorded video signal to the live video signal. At that point the processor 114 can cause the buffer bypass switch 112 to bypass the video buffer and send the source signal directly to display device 116, as shown in step 204, thereby avoiding buffer delay.

In yet a further arrangement playback speed can be selectively increased, for example to fast forward through undesired parts of the presentation, such as commercials. In another arrangement playback can be faster than a normal. For example, selected fields, frames, or groups of pictures (GOPs) can be skipped in order to increase playback speed, and consequently shorten program running time. Furthermore during periods of increased playback speed methods for maintaining lip-synch can be applied. One method of maintaining lip-synch is to speed up audio playback an amount that correlates to the speed increase of the video playback. Equalization can be applied to the audio signal to compensate for a frequency shift that results from the audio speed increase.

Decision block 220 and step 222 permit playback selection between a prior recording or the newly recorded source signal, resulting from an exemplary channel change. After this PVR trick mode playback 222 is complete, playback of multimedia can continue from the newly recorded version of the video source signal from storage 106, as shown in decision block 220 and step 222. Alternatively, upon completion of the prior recording playback from storage 106 can advance to read the most recently recorded portion of video source signal from storage 106, as shown in step 224. In one arrangement playback can be advanced in response to a user request. In another arrangement playback can be faster than a normal playback speed for the multimedia. At step 226, a user notification can be provided to inform the user that the video source is being changed from the recorded video signal to the live video signal.

Referring to step 204, after playback has advanced to the most recent recorded portion of the video source signal, playback of the live version of the video source signal can be substituted for the recorded version of the video source signal. Notably, recording of the video source signal can continue through the advancing and substitution steps. The buffer bypass switch 112 can implement substitution of the live version of the video source signal by bypassing the buffer system and the multimedia processor 110, and coupling the video source signal directly to display 116. Because there is a delay associated with the buffered version of the video source signal, a small portion of the video source signal will generally be skipped or absent as a consequence of the jump in time between the buffered and live versions. An on screen message can notify a user that the PVR is switching back to a live signal and that a small amount of the video source signal will be absent from display 116, however, the missing images will be captured by storage 106. The skipped portion of the video source signal can be viewed by initiating rewind.

Referring back to decision block 206, and to decision block 228 and step 230, if a channel change request is received from a user, the tuner 102 can change channels. An alternate video source can be substituted for the current video source and recorded without interruption. Recording of the alternate video source signal to the data storage 106 can continue from where the current video signal record was ended to avoid deleting any previous video source signal records. Further, the alternate video source signal can be coupled to display 116.

Referring back to steps 226 and 204, if a recorded version of the video signal is being read from storage 106 for playback when a channel change request is received, the buffer bypass switch 112 can switch playback from the recorded version to the live video source signal obtained directly from tuner 102. Significantly, in this embodiment the time delay caused by buffering of the video source signal can be alleviated. Notably, a user can change channels without the inconvenience of waiting for the alternate video source signal to be buffered. Hence, a user can view a channel change nearly instantaneously rather than enduring the annoying latency already described.

As previously discussed, because of the delay associated with the buffered version of the video source signal and a small portion of the video source signal will be skipped when switching between buffered and live versions of the source signal. Hence, at step 226 a user notification can be presented on the display 116 notifying a user that the PVR is switching back to a live signal and that a small amount of the video source signal will be skipped. Further, the user notification can inform the user that the newly selected video source will be recorded in lieu of the present video source.

In one arrangement the user can be provided with an option to continue recording the present video source while viewing the newly selected video source. In such an arrangement the tuner 102 must be able to simultaneously provide multiple source signals, for example source signals form multiple channels. In this arrangement the tuner can send the source signal from the present video source to the storage 106 while providing the source signal from the new video source to the display 116.

It should be understood that the examples and embodiments described herein are for illustrative purposes only and that various modifications or changes in light thereof can be suggested by persons skilled in the art and are to be included within the spirit and purview of this application. The invention can take many other specific forms without departing from the spirit or essential attributes thereof for an indication of the scope of the invention.

What is claimed is:

1. A method for trick mode operation in a personal video recorder without channel change latency, comprising the steps of:
    recording a video source signal;
    bypassing said video source signal to a display device concurrently with initiation of said recording;
    terminating said bypassing responsive to a trick mode request and substituting a recorded version of said video source signal for coupling to said display device; and
    executing said trick mode request using said recorded video source signal.

2. The method according to claim 1, wherein said bypassing step further comprises the steps of:
    substituting an alternate video source signal for coupling to said display device responsive to an alternate video source signal channel selection without significant delay to said alternate selection appearing on said display device.

3. The method according to claim 1, further comprising the step of:
    acknowledging a trick mode request by on screen display message.

4. The method according to claim 3, further comprising the step of
    terminating said on screen display message when said step of substituting said recorded version of said video source signal to said display has been completed.

5. The method according to claim 1, wherein said recording step further comprises:
    recording, without interruption, an alternate video source signal channel selection.

6. The method according to claim 5, wherein said recording step further comprises:
    recording said alternate video source signal channel selection without deleting any previous video source signal records.

7. The method according to claim 1, further comprising:
    transitioning from said trick mode to said video source signal by advancing playback of said recorded version of said video source signal up to the most recently recorded portion of said video signal; and
    substituting said video source signal for coupling to said display device in place of said recorded version of said video source signal, without any buffering delay associated with said recording step.

8. The method according to claim 1, further comprising the steps of:
    transitioning from said trick mode to said video source signal by substituting said video source signal for coupling to said display device in place of said recorded version of said video source signal, without any buffering delay associated with said recording step; and,
    generating a notification that said video source signal is to be substituted for said recorded version of said video source signal.

9. A personal video recorder with trick mode features, comprising:
    a data storage device for recording and playing back a video source signal: and,
    a buffer bypass switch for coupling said video source signal to a display device concurrently with said data storage device recording said video source signal and without buffering delay associated with data storage device during said video source signal recording,
    wherein responsive to a trick mode request said buffer bypass switch terminates said coupling of said video source signal to said display and substitutes a recorded version of said video source signal.

10. The system according to claim 9, further comprising:
    a tuner that substitutes, responsive to user selection of an alternate video source signal channel, without significant buffering delay, an alternate video source signal for coupling to said data storage device and said display device.

11. The system according to claim 9, further comprising:
    means for generating notification of a trick mode request.

12. The system according to claim 11, further comprising:
    means for terminating said notification when said substituting said recorded version of said video source signal to said display has been completed.

13. The system according to claim 9, wherein said data storage device records, without interruption, an alternate video source signal responsive to selection of an alternate video source signal channel.

14. The system according to claim 13, wherein said data storage device records said alternate video source signal without deleting any previously recorded video source signal records.

15. The system according to claim 9, further comprising:
    means for advancing playback of said recorded version of said video source signal to a most recently recorded portion of said video source signal; and
    means for substituting said video source signal to said display device in place of said playback of said recorded version of said video source signal, without significant buffering delay associated with said recording.

16. The system according to claim 9, further comprising:
    means for advancing playback of said recorded version of said video source signal to the most recently recorded portion of said video source signal; and,
    means for generating notification that said video source signal is being substituted for said play back of said recorded version of said video source signal.

* * * * *